(12) United States Patent
Lee et al.

(10) Patent No.: US 9,615,312 B2
(45) Date of Patent: Apr. 4, 2017

(54) METHOD FOR CONNECTION BETWEEN ELECTRONIC DEVICES AND ELECTRONIC DEVICE THEREOF

(71) Applicant: Samsung Electronics Co., Ltd., Gyeonggi-do (KR)

(72) Inventors: Woo-Sung Lee, Gyeonggi-do (KR); Chan-Ho Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 72 days.

(21) Appl. No.: 14/513,954

(22) Filed: Oct. 14, 2014

(65) Prior Publication Data
US 2015/0109897 A1 Apr. 23, 2015

(30) Foreign Application Priority Data
Oct. 17, 2013 (KR) ........................ 10-2013-0123986

(51) Int. Cl.
| | | |
|---|---|---|
| *H04W 4/00* | (2009.01) | |
| *H04W 48/10* | (2009.01) | |
| *H04W 76/02* | (2009.01) | |
| *H04W 4/06* | (2009.01) | |

(52) U.S. Cl.
CPC .......... *H04W 48/10* (2013.01); *H04W 4/008* (2013.01); *H04W 4/06* (2013.01); *H04W 76/02* (2013.01); *H04W 76/027* (2013.01)

(58) Field of Classification Search
None
See application file for complete search history.

(56) References Cited

U.S. PATENT DOCUMENTS

| | | | |
|---|---|---|---|
| 2010/0074261 A1* | 3/2010 | Muhamed | ........... H04L 12/4662 370/395.3 |
| 2011/0289229 A1 | 11/2011 | Subramaniam | |
| 2012/0052802 A1 | 3/2012 | Kasslin et al. | |
| 2012/0117156 A1 | 5/2012 | Anka | |
| 2012/0202185 A1* | 8/2012 | Jabara | ...................... G09B 5/00 434/350 |
| 2012/0258669 A1 | 10/2012 | Honkanen et al. | |
| 2013/0080590 A1* | 3/2013 | Bockus, Jr. | ............. H04L 67/26 709/219 |
| 2013/0089849 A1* | 4/2013 | Huang | ..................... G09B 5/08 434/352 |
| 2013/0122481 A1* | 5/2013 | Rovner | .................... G09B 7/04 434/350 |
| 2013/0165044 A1* | 6/2013 | Xie | ................... H04W 52/0229 455/41.2 |
| 2013/0170432 A1* | 7/2013 | O'Brien | ................. H04W 4/06 370/328 |

(Continued)

FOREIGN PATENT DOCUMENTS

| | | |
|---|---|---|
| EP | 2 317 726 | 5/2011 |
| EP | 2 400 714 | 12/2011 |

*Primary Examiner* — Bob Phunkulh
(74) *Attorney, Agent, or Firm* — The Farrell Law Firm, P.C.

(57) ABSTRACT

Methods and apparatuses are provided for connecting electronic devices. A first electronic device broadcasts a message including at least one of related service information and connectivity information necessary for accessing a wireless access point (AP) accessed by the first electronic device, by using short-range communication. The first electronic device receives a connection request from at least one second electronic device via the wireless AP.

20 Claims, 17 Drawing Sheets

(56) References Cited

U.S. PATENT DOCUMENTS

| | | | | |
|---|---|---|---|---|
| 2013/0173702 A1* | 7/2013 | Lang | .................... | H04L 41/28 |
| | | | | 709/204 |
| 2013/0287010 A1* | 10/2013 | Chen | ................. | H04W 74/0816 |
| | | | | 370/338 |
| 2013/0344469 A1* | 12/2013 | Abrahamson | ............ | G09B 5/00 |
| | | | | 434/350 |
| 2014/0323036 A1* | 10/2014 | Daley | ................... | H04H 20/08 |
| | | | | 455/3.06 |
| 2014/0362749 A1* | 12/2014 | Nakamoto | ............ | H04L 67/125 |
| | | | | 370/310 |

* cited by examiner

SHORT-RANGE WIRELESS
COMMUNICATION ENABLE (b) SHORT-RANGE WIRELESS
COMMUNICATION ENABLE

CHANGE TO SCANNING MODE

METHOD FOR CONNECTION BETWEEN ELECTRONIC DEVICES AND ELECTRONIC DEVICE THEREOF

PRIORITY

This application claims priority under 35 U.S.C. §119(a) to an application filed in the Korean Intellectual Property Office on Oct. 17, 2013 and assigned Serial No. 10-2013-0123986, the content of which is incorporated herein by reference.

BACKGROUND OF THE INVENTION

1. Field of the Invention

The present invention relates generally to a method for connection between electronic devices and, more particularly, to a discovery method used in connecting electronic devices.

2. Description of the Related Art

In a space such as a school, an office, a conference room, a restaurant, a house, etc., electronic devices equipped with a wireless connection function, such as, for example, smartphones, tablets, or computers, are connected with one another over a short distance. These wireless devices share services for education or a conference, and share related materials or multimedia files with one another through the connection. The connection between the electronic devices may be provided by using a discovery protocol.

The discovery protocol includes a universal plug and play (uPnP) used in digital living network alliance (DLNA). The uPnP performs discovery among the electronic devices by using a user datagram protocol (UDP) multicast. In discovery methods implemented using an application program rather than a standard protocol, most of the electronic devices may inform of their existence or may discover other electronic devices existing on a current network by using the UDP multicast or broadcast.

When the UPD multicast or broadcast is not used, a server-based discovery method may be used. Each electronic device enters a network, executes an application, and performs a registering procedure with a corresponding server. When another electronic device enters the network, the electronic device may receive a list of currently registered users from the corresponding server and may recognize the existence electronic devices.

The discovery procedure is performed in an environment in which all electronic devices and the server are connected to an access point (AP) of the same network. If even one electronic device connects to another AP, the discovery procedure may fail.

In addition, when hundreds or thousands of electronic devices are connected to one another, as in a school or an office, and the discovery procedure is performed using the UDP multicast or broadcast, packets are transmitted to all of the electronic devices, and thus, the network may be overloaded. In particular, the multicast or broadcast packets are not smoothly received due to the overload in the wireless network environment, and thus, the discovery procedure may fail. In addition, some network configurations or equipments may not support the multicast.

Further, when using the server-based discovery method, the discovery may be impossible when the server is suddenly down. In addition, when the server is accessed by many people at the same time, a response of the server may be delayed and the discovery procedure may fail. Additionally, there may be a limitation in establishing the server due to technical or cost problems.

SUMMARY OF THE INVENTION

The present invention has been made to address at least the above problems and/or disadvantages and to provide at least the advantages described below. Accordingly, an aspect of the present invention provides a method and an apparatus for a connection between electronic devices separated by a short distance.

Another aspect of the present invention provides a method and an apparatus that allows electronic devices to discover one another by using a bluetooth low energy (BLE) technology, induces the electronic devices to access the same AP by using information of a BLE advertising message, and then supports a service.

According to an aspect of the present invention, a method is provided for connecting electronic devices at a first electronic device. The first electronic device broadcasts a message including at least one of related service information and connectivity information necessary for accessing a wireless AP accessed by the first electronic device, by using short-range communication. The first electronic device receives a connection request from at least one second electronic device via the wireless AP.

According to another aspect of the present invention, a method is provided for connecting electronic devices at a second electronic device. The second electronic device receives, from a first electronic device, a message including at least one of related service information and connectivity information necessary for accessing a wireless AP accessed by the first electronic device, by using short-range communication. The second electronic device transmits, to the first electronic device, a connection request by using the connectivity information via the wireless AP.

According to an additional aspect of the present invention, a first electronic device is provided that includes at least one processor, at least one memory, and at least one program stored in the memory and configured for execution performed by the at least one processor. The at least one program broadcasts a message comprising at least one of related service information and connectivity information necessary for accessing a wireless AP accessed by the first electronic device, by using short-range communication. The program includes instructions for receiving a connection request from at least one second electronic device via the wireless AP.

According to a further aspect of the present invention, a second electronic device is provided that includes at least one processor, at least one memory, and at least one program stored in the memory and configured for execution performed by the at least one processor. The at least one program includes instructions for receiving, from a first electronic device, a message comprising at least one of related service information and connectivity information necessary for accessing a wireless AP accessed by the first electronic device by using short-range communication; and transmitting a connection request to the first electronic device by using the connectivity information via the wireless AP.

BRIEF DESCRIPTION OF THE DRAWINGS

The above and other aspects, features, and advantages of the present invention will be more apparent from the following detailed description when taken in conjunction with the accompanying drawings in which.

DETAILED DESCRIPTION OF EMBODIMENTS OF THE PRESENT INVENTION

Figure 1C:
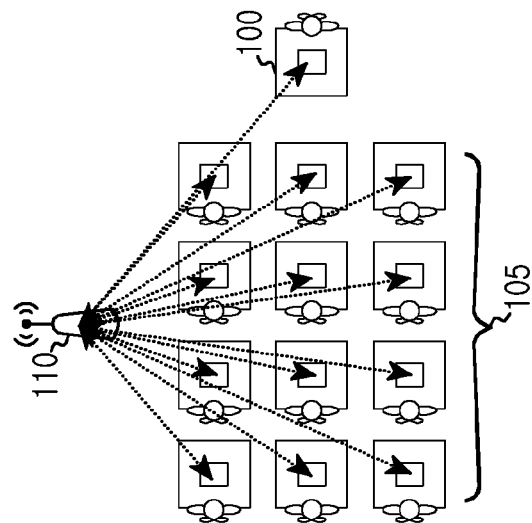
FIGS. 1A-1C are diagrams illustrating connection scenario between electronic devices using short-range communication, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. Also, the terms used herein are defined according to the functions described herein. Thus, the terms may vary depending on user's or operator's intention and usage. That is, the terms used herein must be understood based on the descriptions made herein.

Embodiments of the present invention relate to a method and an apparatus for broadcasting connectivity information and related service information by using short-range communication, inducing a plurality of electronic devices corresponding to the related service information to access the same AP by using the connectivity information, and then supporting a service to proceed with an education or conference.

Short-range communication may be one of Bluetooth communication, infrared ray communication, visible light communication, human body or mediation communication, Zigbee communication, near field communication (NFC), and radio frequency identification (RFID) communication.

A case in which an advertising message is broadcasted by using Bluetooth communication, in particular, Bluetooth low energy (BLE) technology, is described in detail below. However, the short-range communication for transmitting the advertising message is not limited to the Bluetooth communication, and various other short-range communication schemes may be used.

Figure 1B:
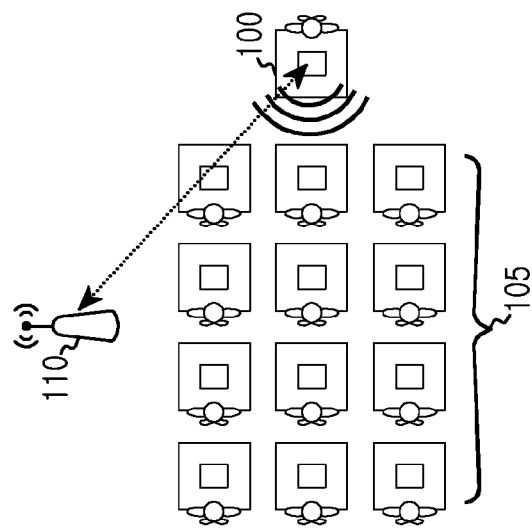
Figure 1A:
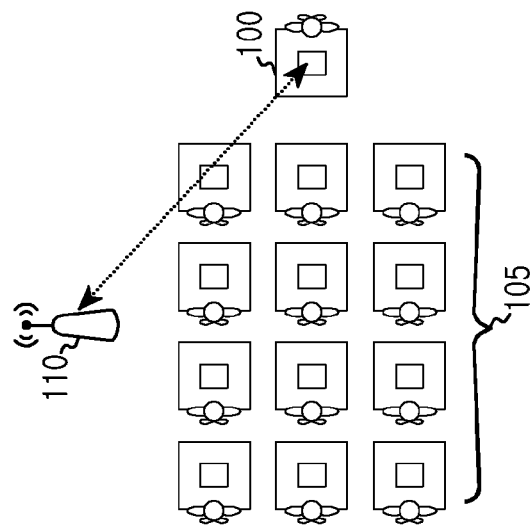

FIGS. 1A-1C are diagrams illustrating a connection scenario between electronic devices using short-range communication, according to an embodiment of the present invention.

Referring to FIG. 1A, a teacher electronic device 100 (or a first electronic device) and a plurality of student electronic devices 105 (or second electronic devices) are provided in a corresponding class of a specific space. The teacher electronic device 100 is connected to a wireless AP 110 based on a wireless communication scheme of IEEE 802.11 standards. Some of the plurality of student electronic devices 105 may be connected to the same wireless AP 110, and/or some of the student electronic devices 105 may be connected to another wireless AP.

Accordingly, the teacher electronic device 100 broadcasts a BLE advertising message including connectivity information and related service information in order for the plurality of student electronic devices 105 to access the wireless AP 100 and to proceed with a lesson, as shown FIG. 1B.

The connectivity information may include at least one of a media access control (MAC) address or a service set identifier (SSID) of the AP 110, or an Internet protocol (IP) address and a port of the teacher electronic device 100. The related service information may include a unique identifier (ID) or a unique name of a service, such as, for example, a lesson service, a conference service, and a file sharing service.

As shown in FIG. 1C, the plurality of student electronic devices 105 in the corresponding class of the specific space may access the wireless AP 110 by using the connectivity information included in the BLE advertising message, and then may try to perform a transmission control protocol (TCP) connection with the teacher electronic device 100. The student electronic devices that have already accessed the wireless AP 110 may omit the procedure for accessing the wireless AP 110, and may directly try to perform the TCP connection with the teacher electronic device 100.

The TCP connection refers to a process for determining whether communication is established or not prior to transmitting data in order to achieve reliable data transmission between a client and server. The server may be the teacher electronic device 100 and the client may be the student electronic device 105.

The electronic devices 100 and 105 may be embodied as a portable terminal, a mobile terminal, a mobile pad, a media player, a tablet computer, a handheld computer, a personal digital assistant (PDA), a server, or a personal computer. In addition, the electronic devices 100 and 105 may be embodied as any electronic device that combines two or more functions of the above-mentioned devices.

Figure 2:
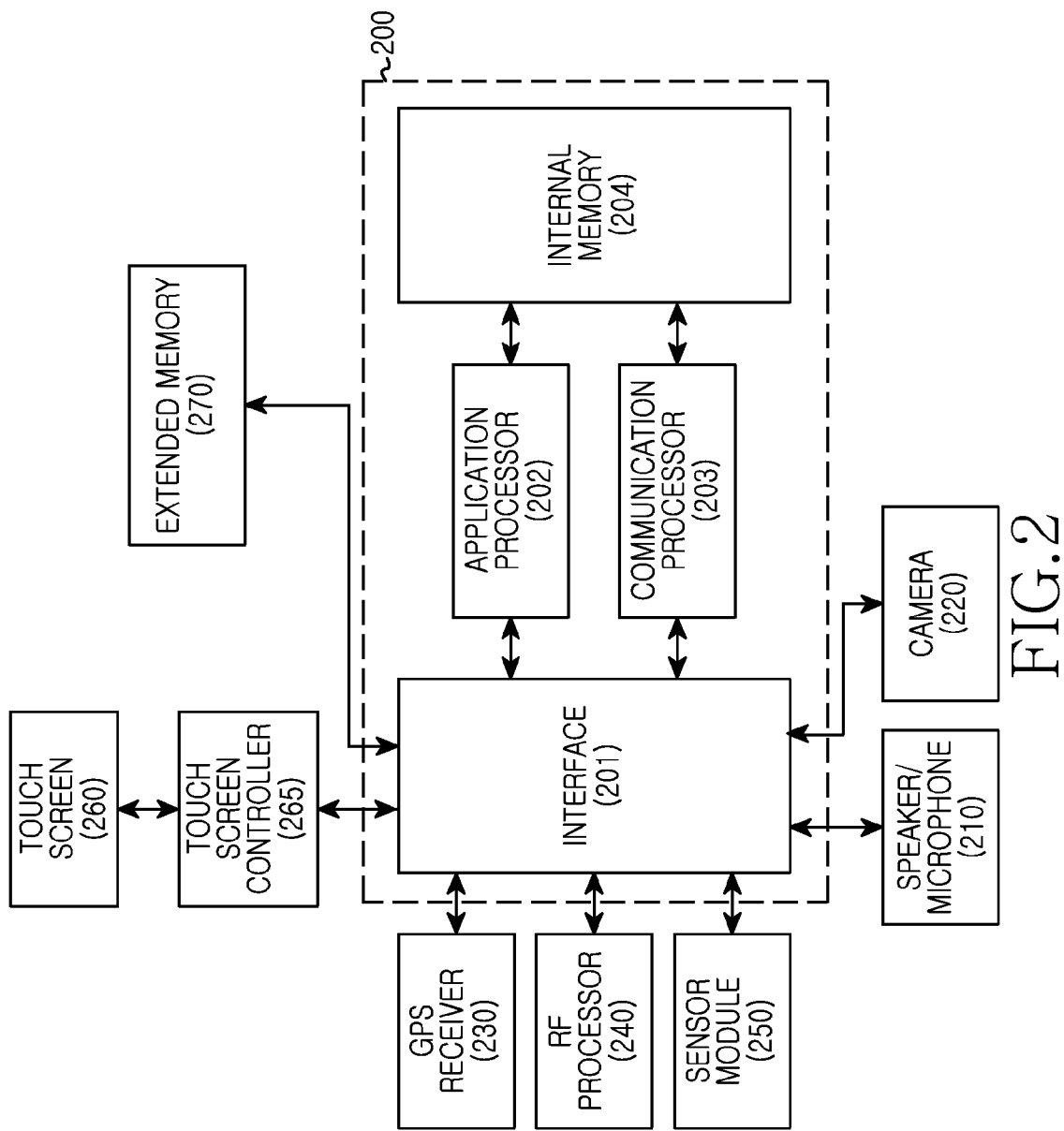
FIG. 2 is a block diagram illustrating a configuration of an electronic device, according to an embodiment of the present invention.

FIG. 2 is a diagram illustrating a configuration of an electronic device, according to an embodiment of the present invention.

Referring to FIG. 2, the electronic device includes a controller 200, a speaker/microphone 210, a camera 220, a global positioning system (GPS) receiver 230, a radio frequency (RF) processor 240, a sensor module 250, a touch screen 260, a touch screen controller 265, and an extended memory 270.

The controller 200 includes an interface 201, one or more processors 202 and 203, and an internal memory 204. The controller 200 may also be referred to as a processor. The interface 201, an application processor 202, a communication processor 203, and the internal memory 240 may be separate elements or may be integrated into one or more integrated circuits.

The application processor 202 performs various functions for the electronic device 100 by executing various software programs. The communication processor 203 processes and controls voice communication and data communication. In addition to such typical functions, the processors 202 and 203 also execute a specific software module (an instruction set) stored in the extended memory 270 or the internal memory 204, and thus, perform various specific functions corresponding to the module. That is, the processors 202 and 203 may control a connection between the electronic devices, according to an embodiment of the present invention, by interworking with software modules stored in the extended memory 270 or the internal memory 204, as described in greater detail below with reference to FIGS. 6-9, 14, and 15.

In addition, the processors 202 and 203 may control selection of at least one of the plurality of pieces of connectivity information, as described in greater detail below with reference to FIGS. 10 and 11.

Further, the processors 202 and 203 may control selection of a scanning channel, as described in greater detail below with reference to FIGS. 16A and 16B, and may control entrusting of an authority of a user who supervises the service after connecting the service, as described in greater detail below with reference to FIGS. 17A and 17B.

According to an embodiment of the present invention, controlling a connection between the electronic devices, controlling selection of at least one of the plurality of pieces of connectivity information, controlling selection of a scanning channel, and controlling entrusting of the authority of the user who supervises the service after connecting the service may be separately performed by a plurality of function blocks (for example, a controller, a transmitter, a receiver, a selector, a determiner, etc.).

The interface 201 connects the touch screen controller 265 of the electronic device and the extended memory 270. The sensor module 250 is coupled to the interface 201 to enable various functions. For example, a motion sensor and an optical sensor may be coupled to the interface 201 to respectively enable motion sensing and external light-beam sensing. In addition thereto, other sensors such as, for example, a location measurement system, a temperature sensor, a biometric sensor, or the like, may be coupled to the interface 201 to perform related functions.

A camera module 720 may be coupled to the sensor module 250 via the interface 201 to perform a camera function, such as, for example, photographing, video clip recording, etc.

The RF processor 240 performs a communication function. For example, the RF processor 240 converts an RF signal into a baseband signal under the control of the communication processor 203, and then provides the baseband signal to the communication processor 203, or converts a baseband signal from the communication processor 203 into an RF signal and transmits the RF signal. Herein, the communication processor 203 processes the baseband signal by using various communication schemes. For example, although not limited thereto, the communication scheme may include a global system for mobile communication (GSM) communication scheme, an enhanced data GSM environment (EDGE) communication scheme, a code division multiple access (CDMA) communication scheme, a wideband-CMDA (W-CDMA) communication scheme, a long term evolution (LTE) communication scheme, an orthogonal frequency division multiple access (OFDMA) communication scheme, a wireless fidelity (Wi-Fi) communication scheme, a worldwide interoperability for microwave access (WiMax) communication scheme, and/or a Bluetooth communication scheme, an infrared ray communication scheme, a visible ray communication scheme, a human body or a mediation communication scheme, a Zigbee communication scheme, an NFC communication scheme, and an RFIC communication scheme.

The speaker/microphone 210 may input and output an audio stream, such as, for example, voice recognition, voice reproduction, digital recording, and telephony functions. That is, the speaker/microphone 210 converts an audio signal into an electric signal or converts the electronic signal into the audio signal. Although not shown, an attachable and detachable earphone, headphone, or headset can be connected to the electronic device 100 via an external port.

The touch screen controller 265 is coupled to the touch screen 260. Although not limited thereto, the touch screen 260 and the touch screen controller 265 may use not only capacitance, resistance, infrared and surface sound wave techniques for determining one or more contact points, but also any multi-touch sense technique including other proximity sensor arrays or other elements to detect a contact, a movement, or stopping thereof.

The touch screen 260 provides an input/output interface between the electronic device and the user. The touch screen 260 includes a display panel and a touch panel. The touch panel is disposed on a front surface of the display panel.

The touch screen 260 delivers a touch input of the user to the electronic device. In addition, the touch screen 260 is a medium that shows an output from the electronic device to the user. That is, the touch screen shows a visual output to the user. Such a visual output is represented in the form of a text, a graphic, a video, and/or a combination thereof.

A variety of displays may be used as the touch screen 260. For example, although not limited thereto, the touch screen 260 may include a liquid crystal display (LCD), a light emitting diode (LED), a light emitting polymer display (LPD), an organic light emitting diode (OLED), an active matrix organic light emitting diode (AMOLED), or a flexible LED (FLED).

The GPS receiver 230 converts a signal received from a satellite into information of a location, a speed, a time, etc. For example, a distance between the satellite and the GPS receiver is calculated by multiplying a speed of light by a signal arrival time, and a location of the electronic device is measured according to a principle of a well-known triangulation by obtaining a distance and a correct location of three satellites.

The extended memory 270 or the internal memory 204 may include one or more fast random access memories and/or a non-volatile memory, such as, for example, a magnetic disc storage device, one or more optical storage devices and/or a flash memory (e.g., NAND, NOR).

The extended memory 270 or the internal memory 204 stores a software component. The software component includes an operating system software module, a communication software module, a graphic software module, a user interface software module, a moving picture experts group (MPEG) module, a camera software module, one or more application software modules, etc. In addition, since a module, i.e., a software component, can be expressed as a group of instructions, the module can also be expressed as an instruction set. The module is also expressed as a program.

The operating system software includes various software components for controlling a general system operation. The control of the general system operation includes memory management and control, storage hardware (device) control and management, power control and management, etc. In addition, the operating system software performs a function for facilitating communication between various hardware elements (devices) and software elements (modules).

The communication software module can enable communication with other electronic devices, such as, for example, a computer, a server, and/or a portable terminal, via the RF processor 240. Further, the communication software module consists of a protocol structure conforming to a corresponding communication scheme.

The graphic software module includes various software components for providing and displaying graphics on the touch screen 260. The term "graphics" indicates a text, a web page, an icon, a digital image, a video, an animation, etc.

The user interface software module includes various software components related to a user interface. The user interface software module includes content related to how a state of the user interface changes and in which condition the state of the user interface changes.

The camera software module includes a camera-related software component that enables camera-related processes and functions. The application module includes a web browser including a rendering engine, an e-mail, an instant message, word processing, keyboard emulation, an address book, a touch list, a widget, a digital rights management (DRM), voice recognition, voice reproduction, a position determining function, a location-based service, etc. The memories 270 and 204 may further include additional modules (instructions) in addition to the aforementioned modules. Alternatively, optionally, some of the modules (instructions) may not be used.

According to embodiments of the present invention, the application module may include instructions for a connection between the electronic devices, as described in greater detail below with reference to FIGS. 6-9, 14, and 15.

In addition, the application module may include instructions for selecting at least one of the plurality of pieces of connectivity information, as described in greater detail below with reference to FIGS. 10 to 11.

In addition, the application module may include instructions for selecting the scanning channel, as described in greater detail below with reference to FIGS. 16A and 16B, and may include instructions for entrusting the authority of the user who supervises the service after connecting the service, as described in greater detail below with reference to FIGS. 17A and 17B.

Figure 3:
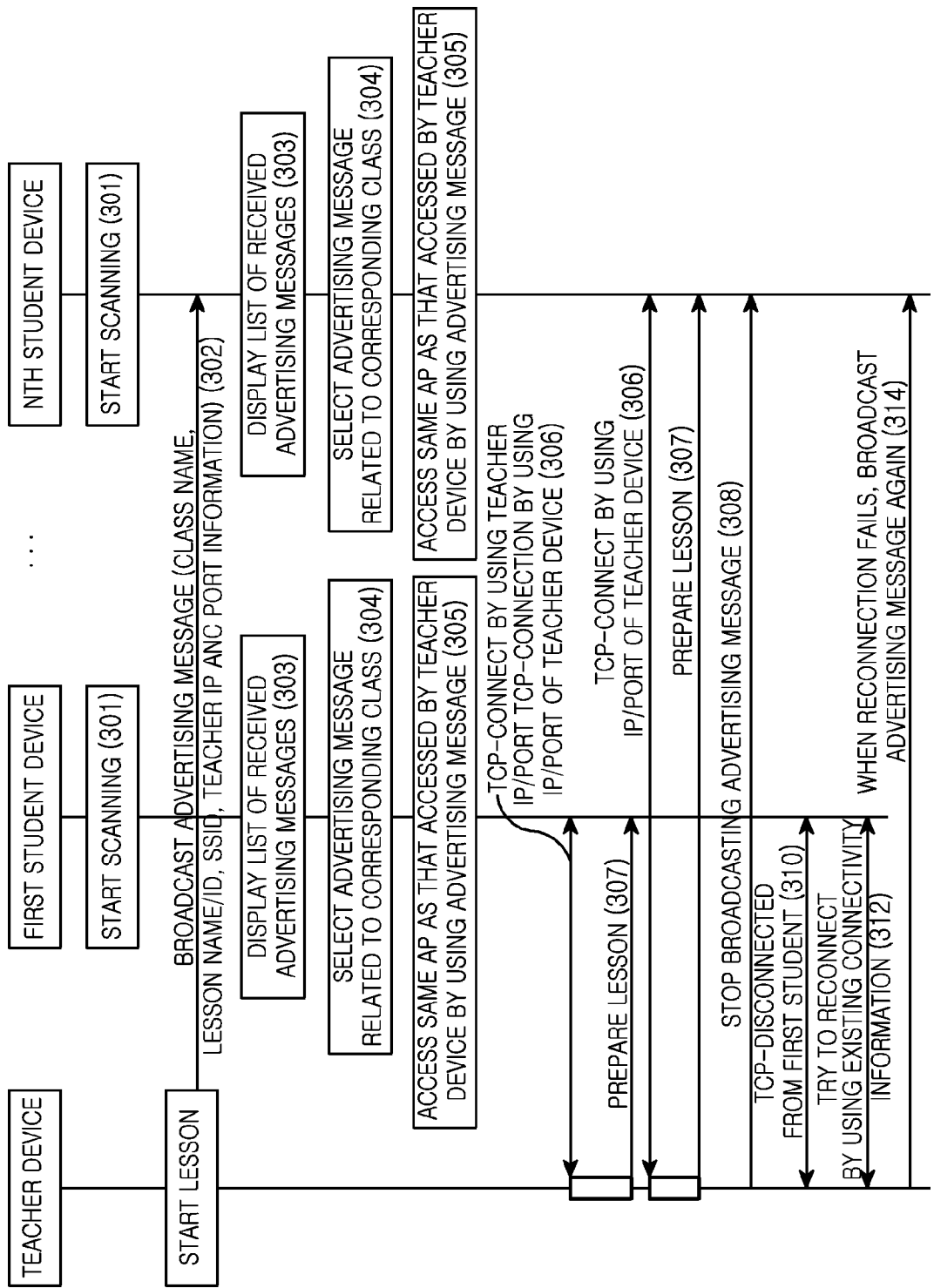
FIG. 3 is a diagram illustrating a signal procedure for a connection between electronic devices for supporting an education service, according to an embodiment of the present invention.

FIG. 3 is a diagram illustrating a signal procedure for a connection between electronic devices to support an education service, according to an embodiment of the present invention.

Referring to FIG. 3, a student electronic device starts scanning to receive a BLE advertisement from a teacher electronic device, in step 301.

The teacher electronic device starts BLE advertising when beginning a lesson, in step 302. Specifically, the teacher electronic device may broadcast an advertising message including at least one of a class name, a lesson name or identifier, a MAC address or an SSID of an AP accessed by the teacher electronic device, and an IP address and port information of the teacher electronic device. Although not shown, an advertising message may also be broadcasted by another teacher electronic device in a neighboring place.

Thereafter, the student electronic device displays a list of received advertising messages, in step 303, selects an advertising message related to the corresponding class from the advertising message list according to a user selection, in step 304, and accesses the same AP as that accessed by the teacher electronic device by using the selected advertising message, in step 305. When the student electronic device has already accessed the same AP as that accessed by the teacher electronic device, step 305 may be omitted. According to an embodiment of the present invention, the advertising message related to the corresponding class may be automatically selected based on prior information.

Thereafter, the teacher electronic device and the student electronic device establish a TCP connection by using the IP address and the port of the teacher electronic device, in step 306.

The teacher electronic device starts preparing the lesson through the TCP connection, in step 307. For example, the teacher electronic device may start taking attendance of the student electronic devices of the class, checking a submission of a report, or transmitting lesson materials.

In step 308, the teacher electronic device stops BLE advertising when it is determined that all of the student electronic devices of the class are connected.

In addition, when the first student electronic device and the teacher electronic device are disconnected from each other, in step 310, the teacher electronic device tries to reconnect by using the existing connectivity information, in step 312.

When the teacher electronic device fails to reconnect, the teacher electronic device starts broadcasting the BLE advertising message again in order for the disconnected first student electronic device to attend the lesson, in step 314.

According to an embodiment of the present invention, when the first student electronic device and the teacher electronic device are disconnected from each other, the teacher electronic device may omit step 312 and may directly restart broadcasting the BLE advertising message.

Figure 4:
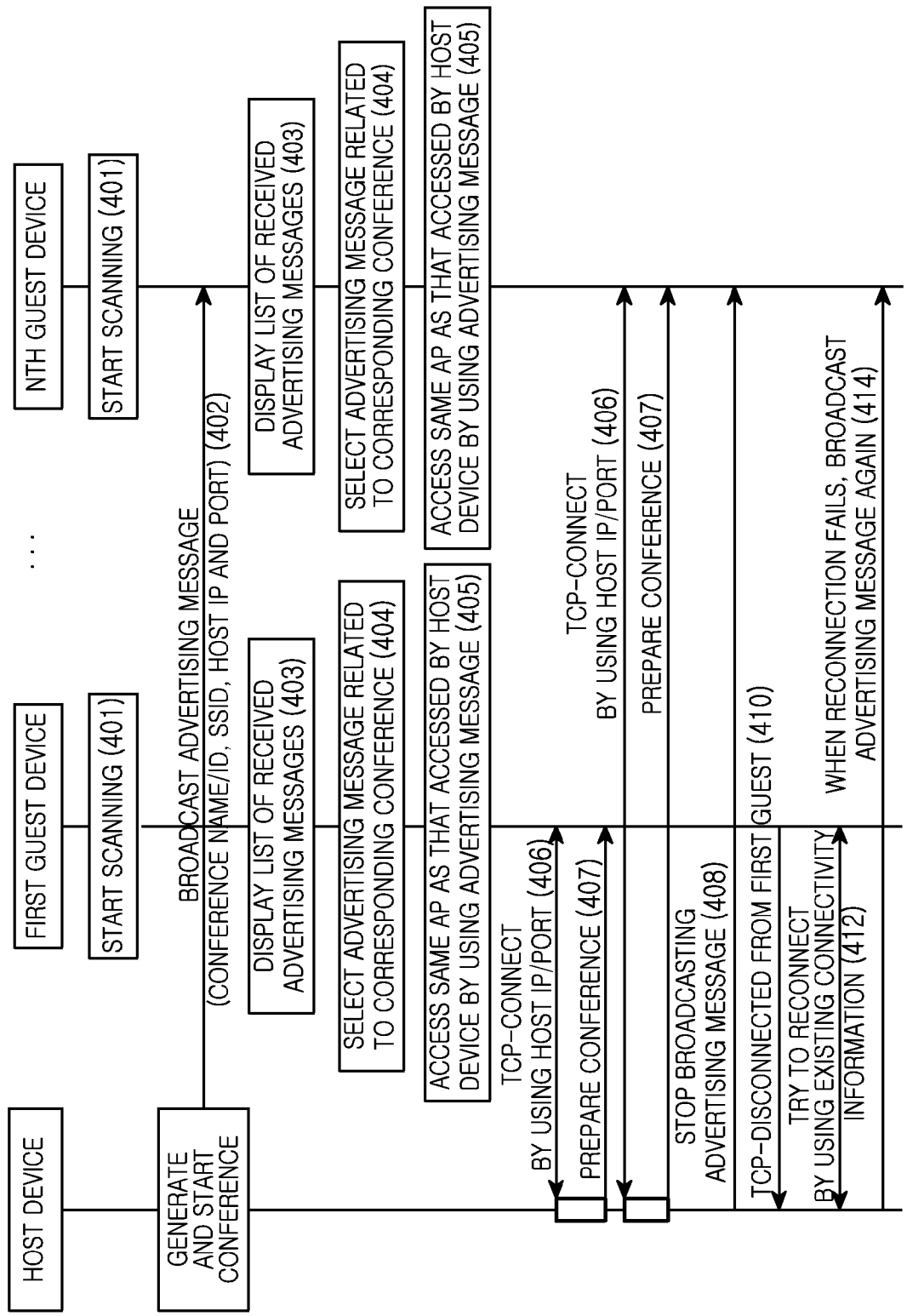
FIG. 4 is a diagram illustrating a signal procedure for a connection between electronic devices for supporting a conference service, according to an embodiment of the present invention.

FIG. 4 is a diagram illustrating a signal procedure for a connection between electronic devices to support a conference service, according to an embodiment of the present invention.

Referring to FIG. 4, a conference attendee electronic device starts scanning to receive a BLE advertisement from a conference supervisor electronic device, in step 401.

The conference supervisor electronic device starts BLE advertising when beginning the conference, in step 402. Specifically, the conference supervisor electronic device may broadcast an advertising message including at least one of a conference name or a conference identifier, a MAC address or an SSID of an AP accessed by the conference supervisor electronic device, and an IP address and port information of the conference supervisor electronic device. Although not shown, an advertising message may also be broadcasted by another conference supervisor electronic device in a neighboring place.

Thereafter, the conference attendee electronic device displays a list of received advertising messages, in step 403, selects an advertising message related to the corresponding conference from the advertising message list according to a user selection, in step 404, and accesses the same AP as that accessed by the conference supervisor electronic device by using the selected advertising message, in step 405. When the conference attendee electronic device has already accessed the same AP as that accessed by the conference supervisor electronic device, step 405 may be omitted. According to an embodiment of the present invention, the advertising message related to the corresponding conference may be automatically selected based on prior information.

Thereafter, the conference supervisor electronic device and the conference attendee electronic device establish a TCP connection by using the IP address and the port of the conference supervisor electronic device, in step 406.

The conference supervisor electronic device starts preparing the conference through the TCP connection, in step 407. For example, the conference supervisor electronic device may start taking attendance of the conference attendees and transmitting conference materials.

In step 408, the conference supervisor electronic device may stop BLE advertising when it is determined that all of the conference attendee electronic devices of the conference room are connected.

In addition, when the first conference attendee electronic device and the conference supervisor electronic device are disconnected from each other, in step 410, the conference supervisor electronic device tries to reconnect by using the existing connectivity information, in step 412.

When the conference supervisor electronic device fails to reconnect, the conference supervisor electronic device starts broadcasting the BLE advertising message again in order for the disconnected first conference attendee electronic device to attend the conference, in step 414.

According to an embodiment of the present invention, when the first conference attendee electronic device and the conference supervisor electronic device are disconnected from each other, the conference supervisor electronic device may omit step 412 and may directly restart broadcasting the BLE advertising message.

Figure 5:
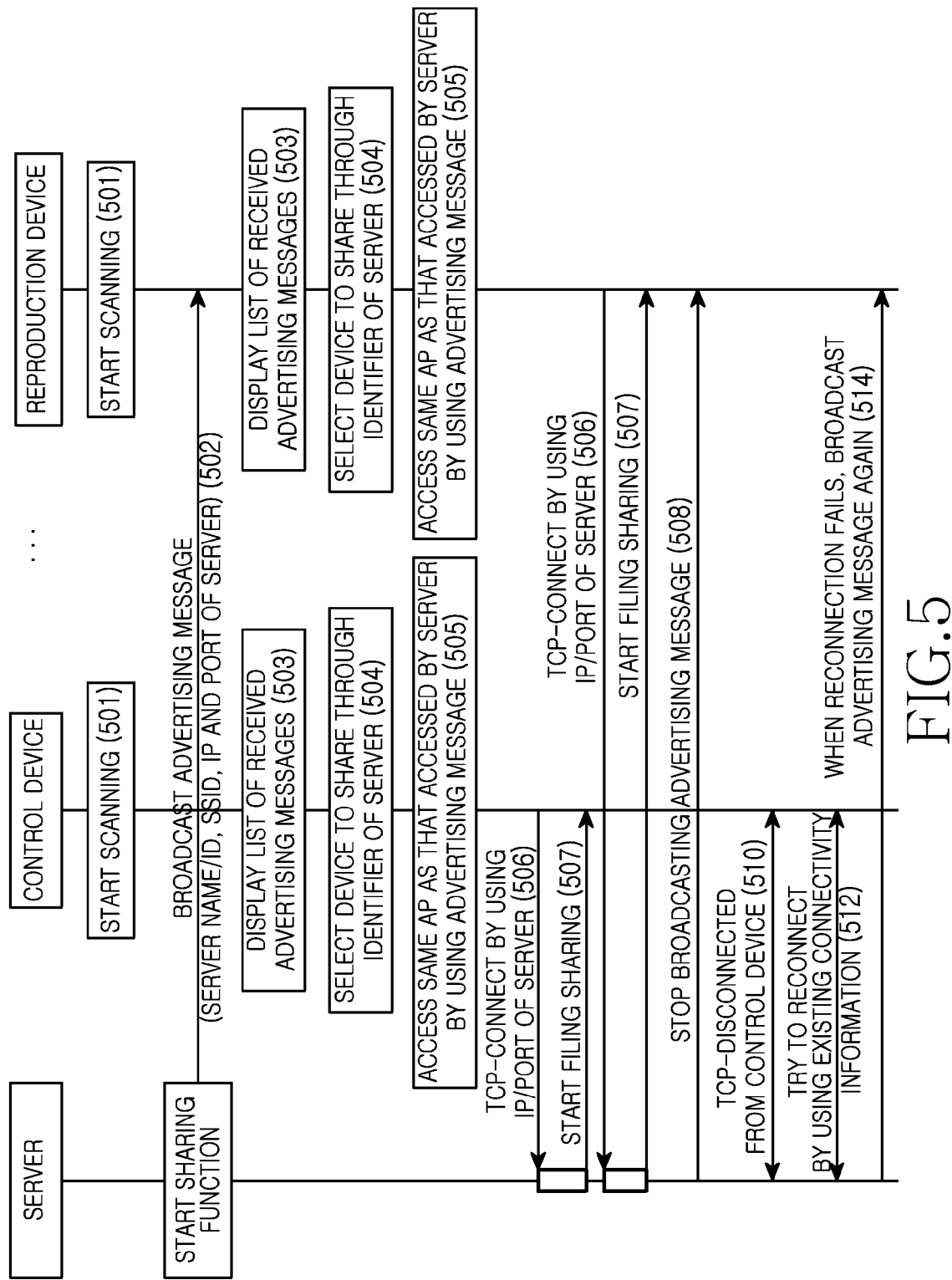
FIG. 5 is a diagram illustrating a signal procedure for a connection between electronic devices for supporting a file sharing service, according to an embodiment of the present invention.

FIG. 5 is a diagram illustrating a signal procedure for a connection between electronic devices to support a file sharing service, according to an embodiment of the present invention.

Referring to FIG. 5, an electronic device corresponding to a client (hereinafter, referred to as a client electronic device) starts scanning to receive a BLE advertisement from an electronic device corresponding to a server (hereinafter, a server electronic device), in step 501.

The server electronic device starts BLE advertising when beginning file sharing, in step 502. Specifically, the server electronic device may broadcast an advertising message including at least one of a server name or identifier, a MAC address or an SSID of an AP accessed by the server electronic device, and an IP address and port information of the server electronic device. Although not shown, an advertising message may also be broadcasted by another server electronic device in a neighboring place.

Thereafter, the client electronic device displays a list of received advertising messages, in step 503, selects an advertising message related to the corresponding server from the advertising message list according to a user selection, in step 504, and accesses the same AP as that accessed by the server electronic device by using the selected advertising message, in step 505. When the client electronic device has already accessed the same AP as that accessed by the server electronic device, step 505 may be omitted. According to an embodiment of the present invention, the advertising message related to the corresponding server may be automatically selected.

The server electronic device and the client electronic device establish a TCP connection by using the IP address and the port of the server electronic device, in step 506.

The server electronic device starts file sharing through the TCP connection, in step 507.

In step 508, the server electronic device stops BLE advertising when it is determined that all of the client electronic devices of the file sharing are connected.

In addition, when the client electronic device and the server electronic device are disconnected from each other, in step 510, the server electronic device tries to reconnect by using the existing connectivity information, in step 512.

When the server electronic device fails to reconnect, the server electronic device starts broadcasting the BLE advertising message again in order for the disconnected client electronic device to attend the file sharing, in step 514.

According to an embodiment of the present invention, when the client electronic device and the server electronic device are disconnected from each other, the server electronic device may omit step 512 and may directly restart broadcasting the BLE advertising message.

As described above, in FIGS. 3 to 5, the electronic device that initially tries to discover (for example, an electronic device of a teacher who starts a lesson in school, an electronic device which supervises a conference in a company, and an electronic device which shares a multimedia file) enters an advertising mode and broadcasts the BLE advertisement.

A mode may be automatically changed to the advertising mode when the teacher electronic device or the conference supervisor electronic device is located in a specific class or a specific conference room.

According to an embodiment of the present invention, the teacher electronic device or the conference supervisor electronic device may enter the advertising mode through a negotiation procedure between the teacher electronic device and the student electronic device or the conference supervisor electronic device and the conference attendee electronic device.

Alternatively, the student electronic device or the conference attendee electronic device may enter a scanning mode to receive the advertising message. In addition, the student electronic device or the conference attendee electronic device may receive the advertising message, access a specific AP, and then try to establish TCP/UDP/Bluetooth connection by using the IP address and the port number of the electronic device of the teacher/conference supervisor/file sharer, which are included in the advertising message.

Since all of the electronic devices are connected by the TCP, the teacher electronic device or the conference supervisor electronic device may check a connection state of the student electronic device or the conference attendee electronic device. When the teacher or conference supervisor electronic device senses a disconnection from the student or conference attendee electronic device, the teacher or conference supervisor electronic device may broadcast the BLE advertising message again in order for the disconnected student or conference attendee electronic device to attend the lesson/conference/file sharing. In this case, the student or conference attendee electronic device enters the scanning mode and receives the BLE advertising message again and tries to reconnect.

Figure 6:
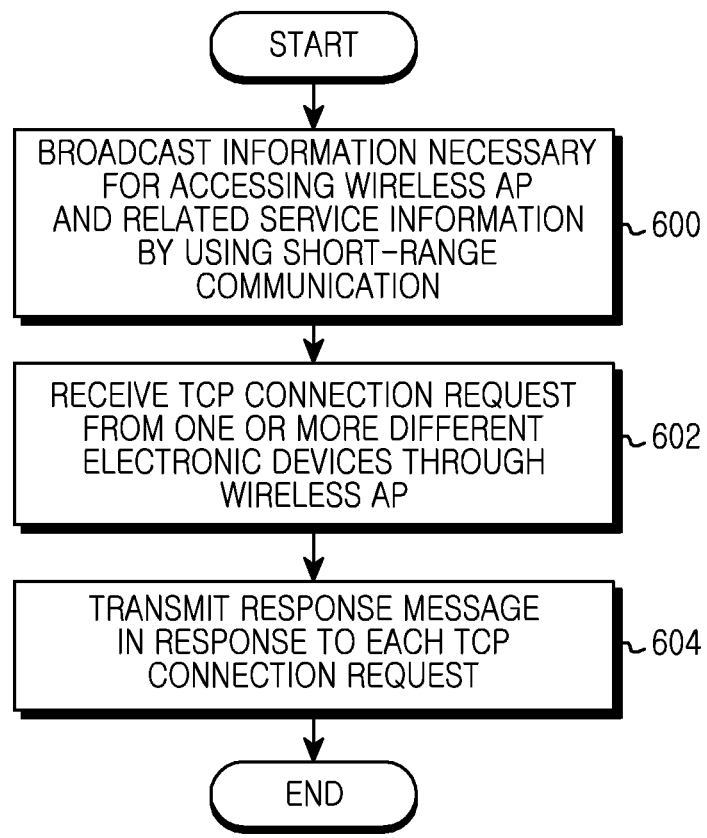
FIG. 6 is a flowchart illustrating a method for connecting electronic devices at a first electronic device, according to an embodiment of the present invention.

FIG. 6 is a flowchart illustrating a method of connecting electronic devices, at a first electronic device, according to an embodiment of the present invention.

Referring to FIG. 6, the first electronic device, which is connected to a specific wireless AP (e.g., a teacher electronic device, a conference supervisor electronic device, and a file sharing electronic device), broadcasts information necessary for accessing the wireless AP and related service information by using short-range communication, in step 600. For example, the first electronic device may enter an advertising mode and may broadcast a BLE advertising message including at least one of a service name or a service identifier, a MAC address or an SSID of the AP accessed by the first electronic device, and an IP address and port information of the first electronic device.

The first electronic device receives a TCP connection request from one or more second electronic devices (e.g., a student electronic device, a conference attendee electronic device, and a client electronic device) via the specific wireless AP, in step 602, and transmits a response message in response to the TCP connection request of each second electronic device, in step 604.

Figure 7:
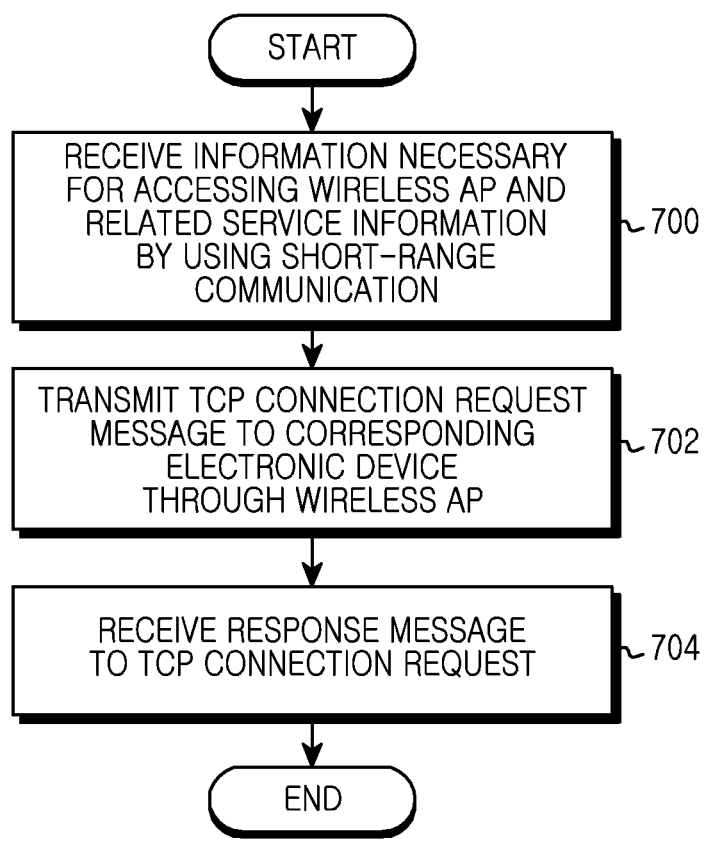
FIG. 7 is a flowchart illustrating a method for connecting electronic devices at a second electronic device, according to an embodiment of the present invention.

FIG. 7 is a flowchart illustrating a method for connecting electronic devices, at a second electronic device, according to an embodiment of the present invention.

Referring to FIG. 7, the second electronic device (e.g., a student electronic device, a conference attendee electronic device, and a client electronic device) enters a scanning mode and receives information necessary for accessing a wireless AP and related service information by using short-range communication, in step 700. For example, the second electronic device may enter the scanning mode and receive a BLE advertising message including at least one of a service name or a service identifier, a MAC address or an SSID of the AP accessed by the first electronic device, and an IP address and port information of the first electronic device from the first electronic device connected to the specific wireless AP (e.g., a teacher electronic device, a conference supervisor electronic device, and a file sharing electronic device).

The second electronic device transmits a TCP connection request to the first electronic device via the specific wireless AP, in step 702, and receives a response message in response to the TCP connection request, in step 704.

It is common for the electronic device connected to the wireless AP to use an SSID of the AP to establish a WiFi connection. In addition, in the case of WiFi roaming, a roaming service can be provided when the SSID is identical to security authentication. However, the WiFi roaming may cause the electronic device to connect to WiFi of a neighboring class. Accordingly, when the electronic device delivers WiFi information to the student electronic device when beginning the lesson, the electronic device may broadcast the MAC address rather than the SSID, and thus, may induce the student electronic device to connect to the wireless AP in the corresponding class even if the student electronic device has the same SSID.

The teacher electronic device and the student electronic device may download necessary data via a server when they are connected to the wireless AP, and student-teacher connection/reconnection/termination may be controlled.

When the attendee electronic device is disconnected in a TCP connection state between the supervisor electronic device and the attendee electronic device, the supervisor electronic device may sense this. In this case, the supervisor electronic device may know which attendee electronic device is disconnected and may broadcast the BLE advertising message again. On the other hand, when the attendee electronic device is disconnected, the attendee electronic device may sense this and directly enter the scanning mode to be ready to receive the BLE advertising message of the supervisor electronic device.

Figure 8:
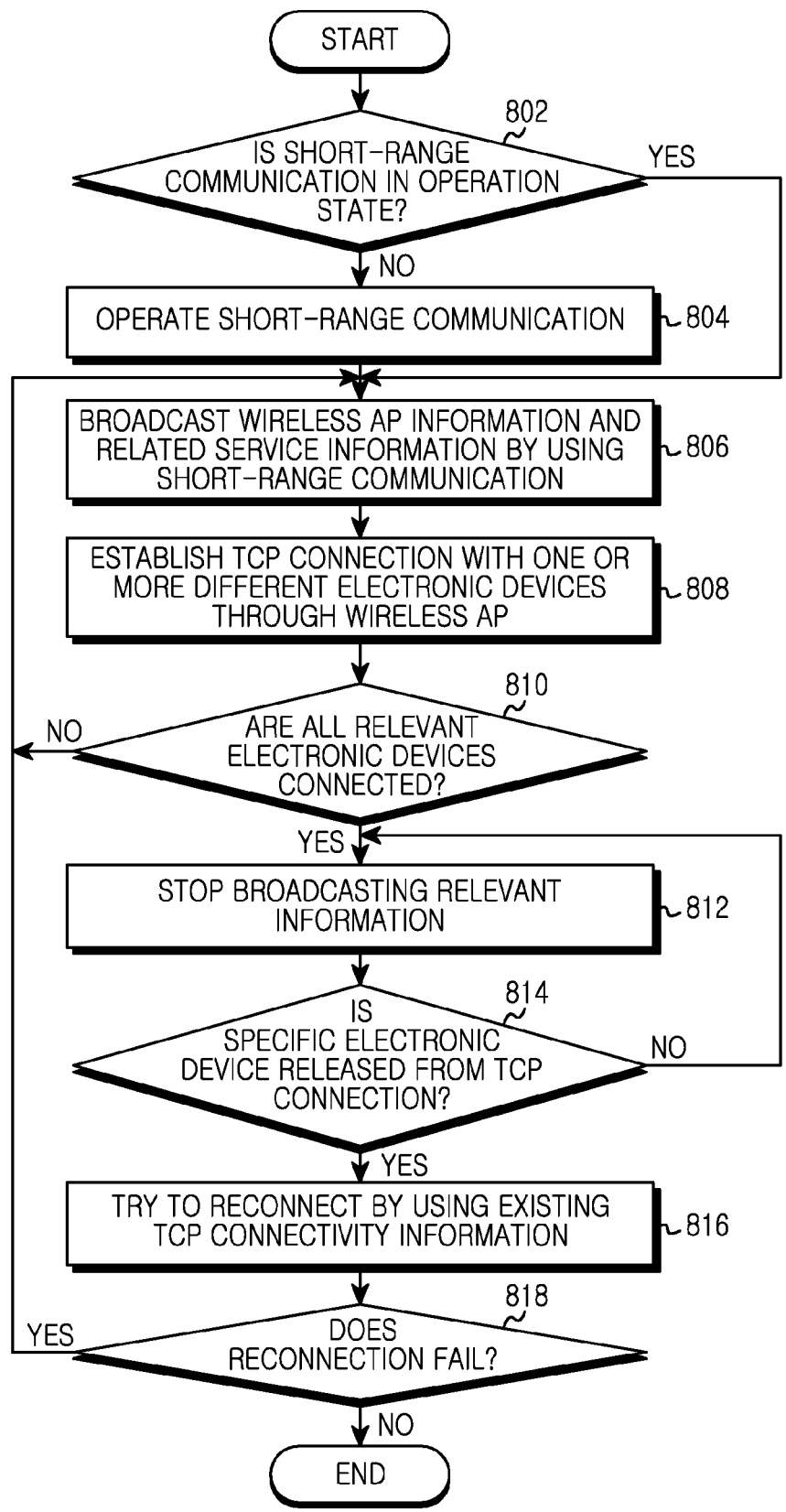
FIG. 8 is a flowchart illustrating a method for connecting electronic devices at a first electronic device, according to an embodiment of the present invention.

FIG. 8 is a flowchart illustrating a method for connecting electronic devices, at a first electronic device, according to an embodiments of the present disclosure.

Referring to FIG. 8, a first electronic device (e.g., a teacher electronic device, a conference supervisor electronic device, and a file sharing electronic device), which is connected to a specific wireless AP, determines whether short-range communication (e.g., Bluetooth communication) is in an operation state, that is, in an enabled state or not, in step 802.

When the short-range communication is not in the operation state, the short-range communication is enabled, step 804.

When it is determined that the short-range communication is in the operation state in step 802, or after the short-range communication is enabled in step 804, the first electronic device broadcasts information necessary for accessing the wireless AP and related service information by using the short-range communication, in step 806. For example, the first electronic device may enter an advertising mode and broadcast a BLE advertising message including at least one of a service name or a service identifier, a MAC address or an SSID of the AP accessed by the first electronic device, and an IP address and port information of the first electronic device.

In step 808, the first electronic device establishes a TCP connection with one or more second electronic devices (e.g., a student electronic device, a conference attendee electronic device, and a client electronic device) via the specific wireless AP.

In step 810, the first electronic device determines whether all of the second electronic devices (e.g., lesson or conference attendee electronic devices) are connected or not. When all of the second electronic devices are connected, broadcasting of the BLE advertising message is ceased, in step 812. When all of the second electronic devices (e.g., the lesson or conference attendee electronic devices) are not connected, the procedure returns to step 806 to rebroadcast the necessary information.

According to an embodiment of the present invention, the first electronic device may broadcast the BLE advertising message periodically regardless of whether the second electronic devices are connected.

In step 814, the first electronic device determines whether a specific second electronic device from among the related second electronic devices is disconnected. When the specific second electronic device from among the related second electronic devices is released from the TCP connection, the first electronic device tries to reconnect by using the existing TCP connectivity information. When the specific second electronic device is not released from the TCP connection, the procedure returns to step 812.

In step 818, it is determined whether the reconnection of step 816 fails. When the first electronic device fails to reconnect, the procedure returns to step 806 to broadcast the BLE advertising message including at least one of the service name or service identifier, the MAC address or SSID of the AP accessed by the first electronic device, and the IP address and port information of the first electronic device again. When the first electronic device does not fail to reconnect, the procedure terminates.

According to an embodiment of the present invention, when the specific second electronic device from among the related second electronic devices is released from the TCP connection, the first electronic device may directly broadcast the BLE advertising message including the connectivity information and the related service information again without trying to reconnect by using the existing information.

Figure 9:
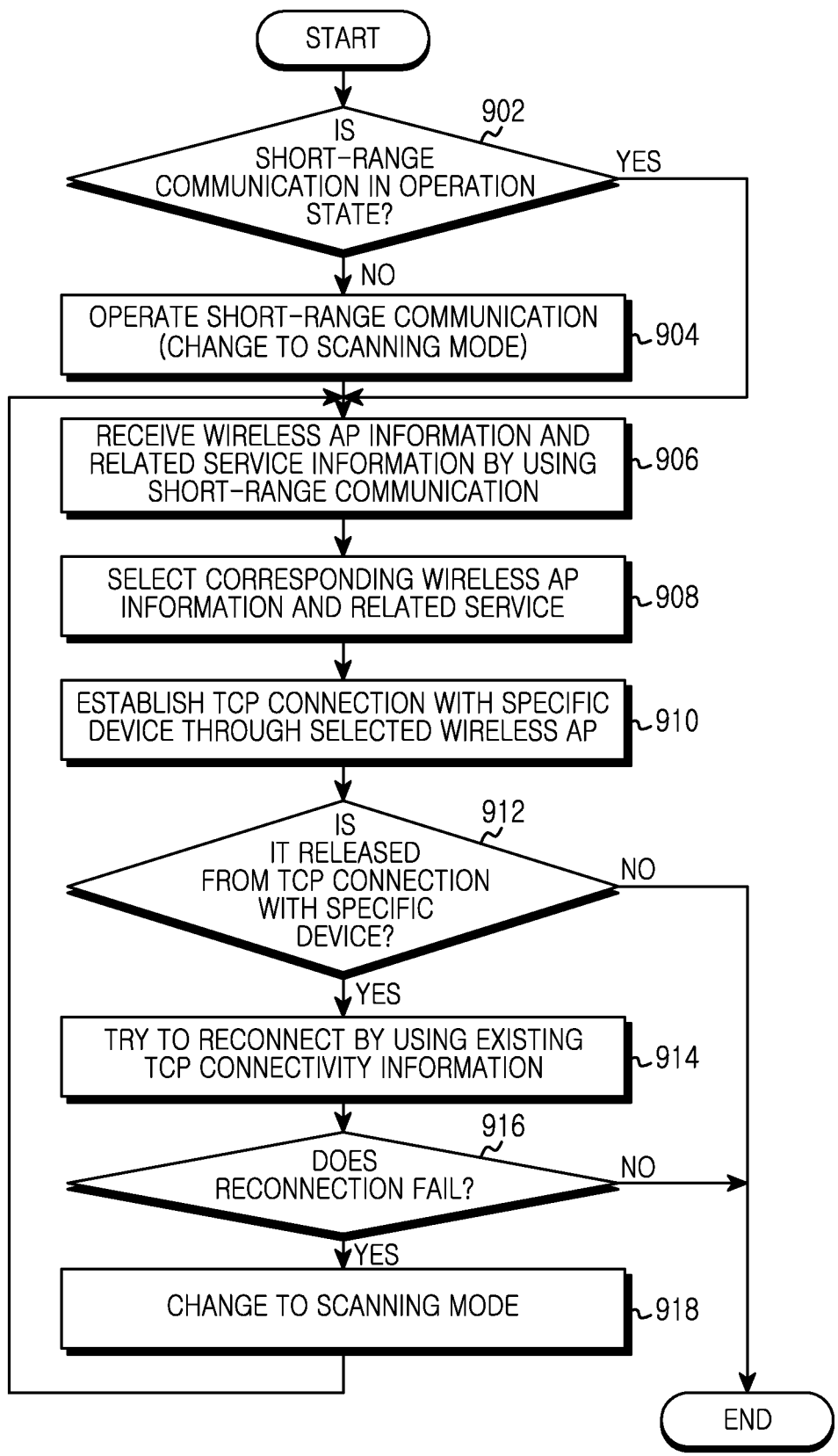
FIG. 9 is a flowchart illustrating a method for connecting electronic devices at a second electronic device, according to an embodiment of the present invention.

FIG. 9 illustrates is a flowchart illustrating a method for connecting electronic devices, at a second electronic device, according to an embodiment of the present invention.

Referring to FIG. 9, the second electronic device (e.g., a student electronic device, a conference attendee electronic device, and a client electronic device) determines whether short-range communication (e.g., Bluetooth communication) is in an operation state, that is, in an enabled state or not, in step 902.

When the short-range communication is not in the operation state, the short-range communication is enabled, in step 904.

When it is determined that the short-range communication is in the operation state in step 902, or after the short-range communication is enabled in step 904, the second electronic devices enters a scanning mode and receives information necessary for accessing a wireless AP and related service information by using the short-range communication, in step 906. For example, the second electronic device may enter the scanning mode and receive a BLE advertising message including at least one of a service name or a service identifier, a MAC address or an SSID of an AP accessed by the first electronic device, and an IP address and port information of the first electronic device from the first electronic device (e.g., a teacher electronic device, a conference supervisor electronic device, and a file sharing electronic device), which is connected to the specific wireless AP. The second electronic device may also receive the BLE advertising message from another first electronic device.

In step 908, the second electronic device selects corresponding wireless AP information and a related service from the list of at least one BLE advertising message received from the first electronic device.

In step 910, the second electronic device establishes a TCP connection with the first electronic device via the specific wireless AP.

In step 912, the second electronic device determines whether the second electronic device is disconnected from the first electronic device or not. When the second electronic device is released from the TCP connection with the first electronic device, the second electronic device tries to reconnect by using the existing TCP connectivity information, in step 914. When the second electronic device is not released from the TCP connection, the procedure terminates.

In step 916, the second electronic device determines whether the reconnection fails. When the second electronic device fails to reconnect, the second electronic device changes to a scanning mode, in step 918, and returns step 906 to receive the BLE advertising message including the at least one of the service name or the service identifier, the MAC address or the SSID of the AP accessed by the first electronic device, and the IP address and the port information of the first electronic device again. When the second electronic device does not fail to reconnect, the procedure terminates.

According to an embodiment of the present invention, when the second electronic device is released from the TCP connection with the first electronic device, the second electronic device may directly enter the scanning mode without trying to reconnect by using the existing information, and may receive the BLE advertising message including the connectivity information and the related service information again.

Since the BLE advertising message is broadcasted via a wireless channel, anyone can receive the BLE advertising message within a range in which a radio wave is received. In this case, since a student or conference attendee electronic device of another class or conference room may attend a lesson of a neighboring class or a conference of a neighboring conference room, there may be confusion in the lesson or conference. Therefore, there is a need for a method for preventing student electronic devices of other classes or attendee electronic devices of other conference rooms from attending the lesson or conference.

As a method for preventing a student electronic device or a conference attendee electronic device from attending other lessons or other conferences, when the student electronic device has class information, the pre-stored class information is compared with the related service information included in the BLE advertising message, and the student electronic device is prevented from attending the class according to a result of the comparing. For example, when information on each lesson of each class is a unique number of each lesson, the unique number may be provided in advance at the beginning of a term or through other lessons. The unique number may be configured as unique lesson information regarding all lessons of every term, every week, every day, and every time. Accordingly, when the teacher electronic device broadcasts the BLE advertising message, the BLE advertising message may be transmitted to the student electronic devices along with a unique class ID or information derived from the class ID. In this case, the student electronic device matches the class information pre-stored at a corresponding time with teacher's unique lesson information, and can obtain corresponding class information when information of the corresponding time is consistent with the teacher's unique lesson information, as described in greater detail below with reference to FIG. 11.

Figure 10:
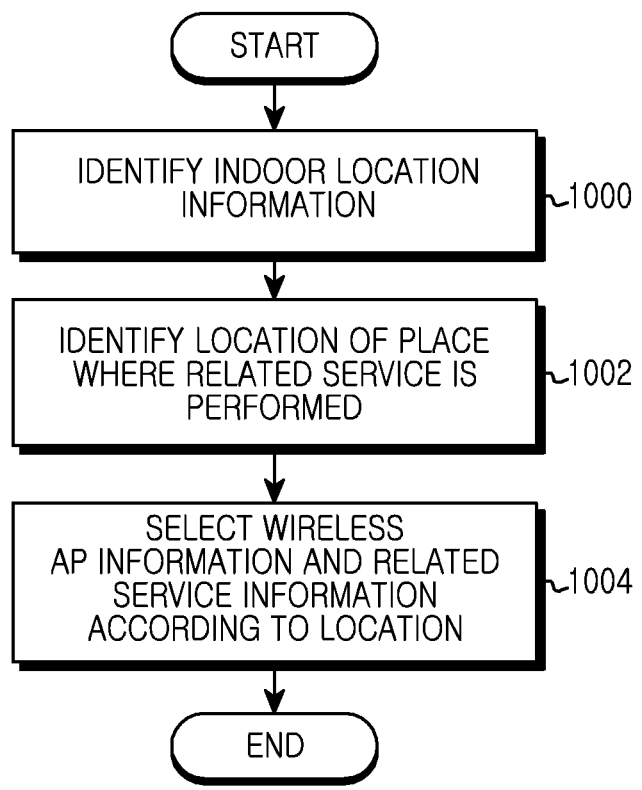
FIG. 10 is a flowchart illustrating a method for selecting at least one of a plurality of pieces of connectivity information by using location information at a second electronic device, according to an embodiment of the present invention.

As a method for preventing a student electronic device or a conference attendee electronic device from attending other lessons or other conferences, when the student electronic device has no class information, the student electronic device detects a class corresponding to a location of the student electronic device based on location information of the student electronic device in various indoor positioning methods, such as WiFi Positioning System (WPS), NFC, BLE tagging, etc., and determines whether to attend the lesson by determining whether location information is consistent with unique lesson information broadcasted by the teacher electronic device, as described in greater detail with reference to FIG. 10.

Figure 13A:
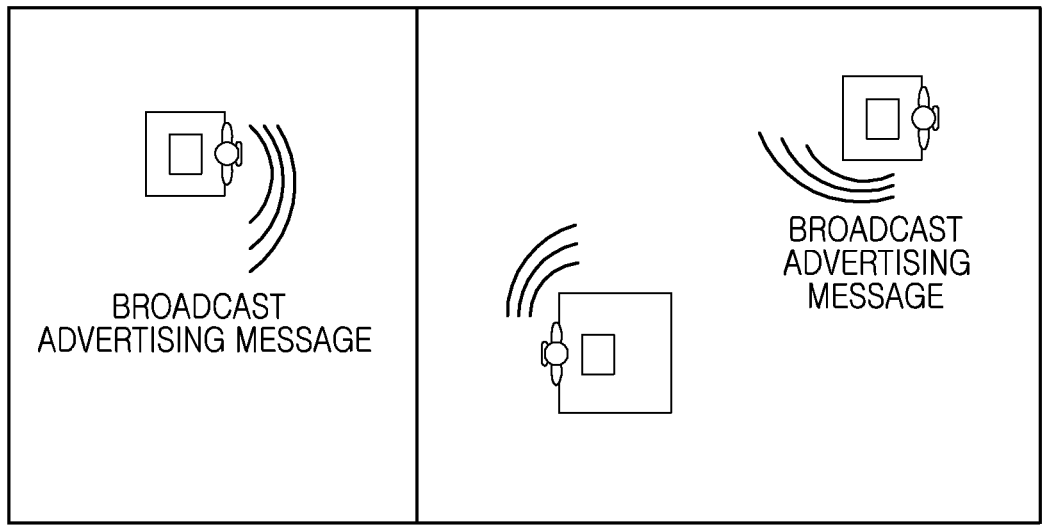
FIGS. 13A and 13B are diagrams illustrating an operation of receiving connectivity information and related service information according to a location, according to an embodiment of the present invention.
Figure 13B:
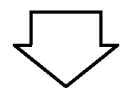
Figure 13B:
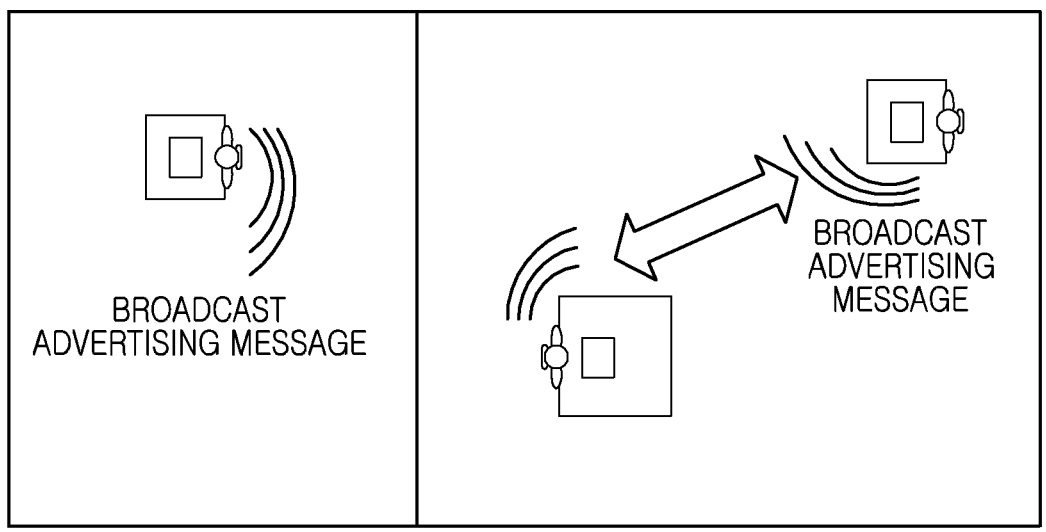

For example, it may be assumed that the student electronic device is located in a B class as shown in FIG. 13A. In this case, when the student electronic device receives a first BLE advertising message broadcasted by a teacher electronic device of an A class and a second BLE advertising message broadcasted by a teacher electronic device of the neighboring B class at the same time, the student electronic device of the B class may select the second BLE advertising message corresponding to the B class from among the first and second BLE advertising messages by using a positioning method (that is, the student electronic device may sense that it is located in the B class), as shown in FIG. 13B, and may obtain connectivity information.

According to another embodiment of the present invention, as a method for preventing a student electronic device or a conference attendee electronic device from attending other lessons or other conferences, a method of preventing neighboring classes from using the same scanning channel to receive the BLE advertising message may be used.

For example, three physical scanning channels may be spatially allocated as shown in Table 1 below:

TABLE 1

| 1 | 3 | 1 |
| 2 | 1 | 2 |
| 3 | 2 | 3 |

For Example, the teacher electronic device may set scanning channels not to overlap with one another for neighboring classes based on a location and a time of each class through a class identifier of each channel. Accordingly, the student electronic device can be prevented from erroneously accessing teacher electronic devices of other classes regardless of whether the student electronic devices scan all channels or scan only a specific channel based on their respective class information. Table 1 shows an embodiment in which three channels are arranged not to overlap with one another. However, the present invention can also be applied when the number of channels for broadcasting the BLE advertising message is n.

FIG. 10 is a flowchart illustrating selection of at least one of a plurality of pieces of connectivity information, at the second electronic device, by using location information, according to an embodiment of the present invention.

Referring to FIG. 10, the second electronic device identifies its location in various indoor positioning methods such as WPS, NFC, BLE tagging, etc., in step 1000, identifies a location of a place where a related service is performed (e.g., a specific class or a specific conference room), in step 1002, and selects wireless AP information and related service information according to the location, in step 1004. For example, when the second electronic device is located in a B class and receives BLE advertising messages from a neighboring A class and the B class, the second electronic device may recognize that it is located in the B class and may select the BLE advertising message corresponding to the B class.

Figure 11:
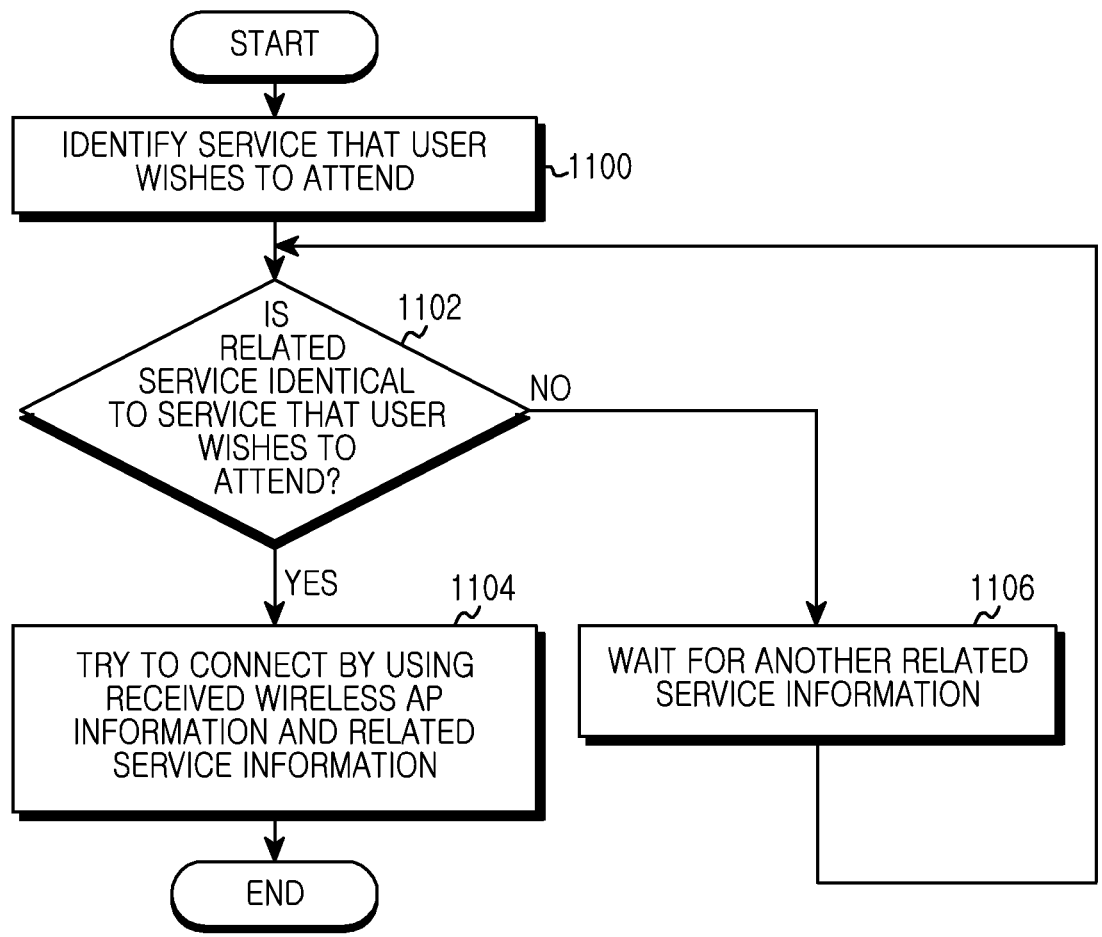
FIG. 11 is a flowchart illustrating a method for selecting at least one of a plurality of pieces of connectivity information, at a second electronic device, by comparing information on a service that a user wishes to attend and received information on a related service, according to an embodiment of the present invention.

FIG. 11 is a flowchart illustrating a method for selection of at least one of a plurality of pieces of connectivity information, at the second electronic device, by comparing information on a service that a user wishes to attend and received information on a related service, according to an embodiment of the present invention.

Referring to FIG. 11, the second electronic device identifies a lesson or a conference that the user wishes to attend based on pre-set information, in step 1100, and determines whether the service that the user wishes to attend is identical to a related service of a BLE advertising message by comparing the related service information in the received BLE advertising message and the pre-set information, in step 1102.

When the service that the user wishes to attend is identical to the related service of the BLE advertising message, the second electronic device tries to connect by using connectivity information (e.g., a MAC address of an AP, an SSID, or an IP address and port information of a class or conference supervisor electronic device) in the received BLE advertising message, in step 1104. When the service is not identical to the related service of the BLE advertising message, the second electronic device waits for another piece of related service information in another BLE advertising message, in step 1106.

Figure 12A:
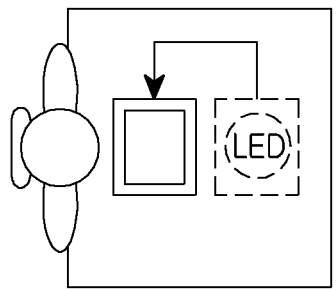
FIGS. 12A-12C are diagrams illustrating a method and time for enabling short-range communication, according to an embodiment of the present invention.
Figure 12B:
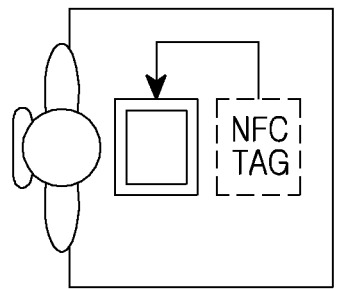
Figure 12C:
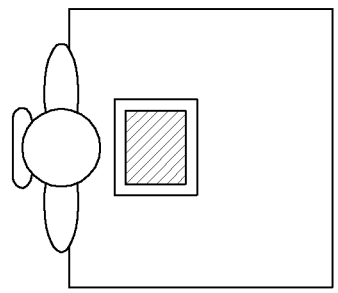

In FIGS. 1 to 11, it is assumed that a BLE function is in an enabled state when a connection is attempted using an initial BLE advertising message. However, the BLE function may be in a disabled state. FIGS. 12A-12C illustrate an operation of an electronic device when a BLE function is in a disabled state.

FIGS. 12A-12C are diagrams illustrating a method and time for enabling short-range communication, according to an embodiment of the present invention.

Referring to FIG. 12A, when a second electronic device having its Bluetooth function disabled is connected by visible light communication through an LED arranged in each place at the time of starting a conference/lesson/file sharing, the second electronic device may allow a BLE function necessary for the conference/lesson/file sharing to enter an enabled state. Upon sensing a time and visible light communication, the second electronic device may operate the BLE function and cause a mode to be changed to a BLE scanning mode to be able to receive a BLE advertising message broadcasted by a first electronic device, which is a supervisor, as shown in FIG. 12C. According to an embodiment of the present invention, the second electronic device may directly discover by using the visible light communication without using the BLE function.

According to another embodiment of the present invention, an NFC tag may be attached around attendee electronic devices as shown in FIG. 12B. Therefore, when the attendee electronic device is placed close to an NFC tag of a supervisor electronic device, the attendee electronic device may sense the supervisor electronic device through NFC communication and may allow the BLE function to enter an enabled state, so that the attendee electronic device can enter a scanning mode, as shown in FIG. 12C.

FIGS. 12A and 12B illustrate an operation of enabling the BLE function by using visible light communication or the NFC tag, and operating in the BLE scanning mode. In addition, in the case of an electronic device capable of human body communication, a supervisor may allow a BLE function to automatically enter an operation state by directly touching an electronic device of an attendee while still touching the supervisor's electronic device.

According to another embodiment of the present invention, when a lesson time or a conference time is set, the BLE function may be automatically enabled at a specific time.

Various sensors of other methods or connectivity methods may be used in addition to the NFC communication, visible light communication, sound communication, and human body communication.

FIGS. 13A and 13B are diagrams illustrating an operation of receiving connectivity information and related service information according to a location, according to an embodiment of the present invention.

Referring to FIG. 13A, the teacher electronic device of the A class and the teacher electronic device of the B class enter the advertising mode to broadcast the BLE advertising message, and the student electronic device of the B class receives the BLE advertising messages from the teacher electronic devices of the A class and the B class in the scanning mode.

Referring to FIG. 13B, the student electronic device of the B class selects one of the BLE advertising messages received from the teacher electronic devices of the A class and the B class by using pre-stored class information, or selects one of the BLE advertising messages by using location information of the B class when the student electronic device has no pre-stored class information. For example, the student electronic device of the B class may select the BLE advertising message of its own class, may access a wireless AP by using connectivity information in the BLE advertising message, and may try to establish a TCP connection with the teacher electronic device of the B class.

Figure 14:
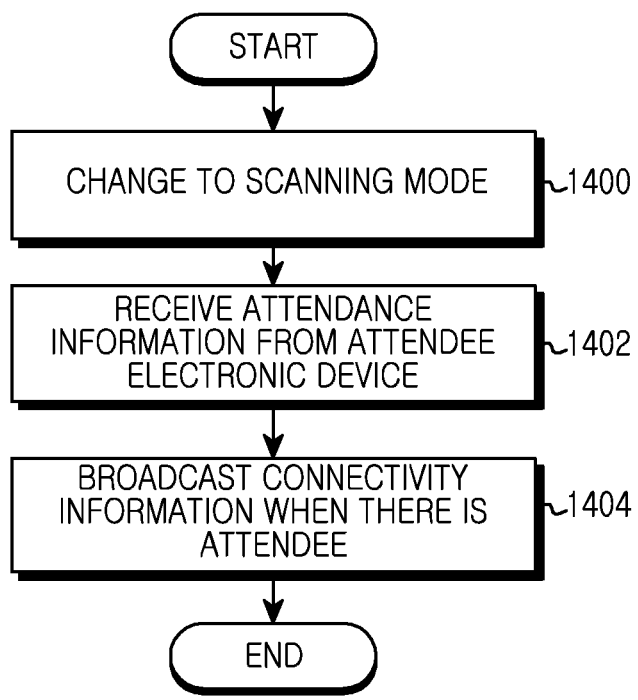
FIG. 14 is a flowchart illustrating a method for broadcasting connectivity information, at a first electronic device, in response to attendance information of a second electronic device, according to an embodiment of the present invention.
Figure 15:
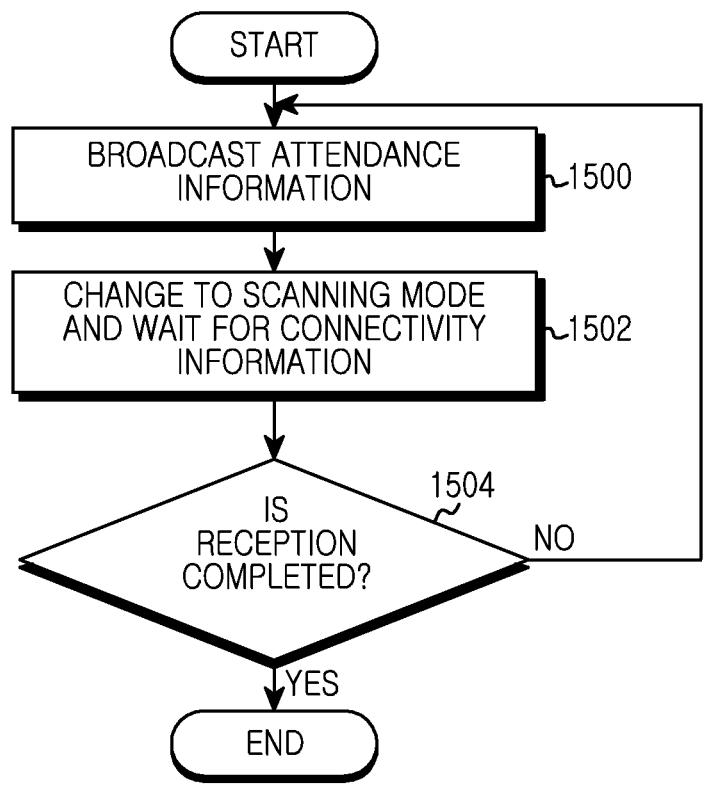
FIG. 15 is a flowchart illustrating a method for receiving connectivity information, at a second electronic device, after broadcasting attendance information, according to an embodiment of the present invention.

In addition, another attendee electronic device may additionally enter during a lesson or conference. FIGS. 14 and 15 illustrate an operation method when an additional attendee electronic device enters during a lesson/conference/file sharing.

FIG. 14 is a flowchart illustrating a method for broadcasting connectivity information, at a first electronic device, in response to attendance information of a second electronic device, according to an embodiment of the present invention.

Referring to FIG. 14, the first electronic device periodically enters a scanning mode after starting a lesson/conference/file sharing, and scans information of an electronic device that wishes to attend, in step 1400. The first electronic device receives an advertising message including attendance information from the second electronic device, in step 1402. When there is an attendee electronic device, the first electronic device changes the scanning mode to an advertising mode and transmits a BLE advertising message including connectivity information, in step 1404.

FIG. 15 is a flowchart illustrating a method for receiving connectivity information, at a second electronic device, after broadcasting attendance information, according to an embodiment of the present invention.

Referring to FIG. 15, when the second electronic device does not attend a lesson/conference/file sharing after the lesson/conference/file sharing starts, the second electronic device enters an advertising mode and periodically broadcasts an advertising message including service information that the second electronic device wishes to attend, in step 1500.

The second electronic device changes from the advertising mode to a scanning mode after a predetermined time after transmitting the advertising message and waits for a BLE advertising message from a first electronic device, in step 1502.

The second electronic device may alternate between the advertising mode and the scanning mode until the second electronic device receives a corresponding BLE advertising message from the first electronic device. In step 1504, it is determined whether reception is completed. When reception is completed, the procedure terminates. When reception is not completed, the second electronic device returns to step 1550 to broadcast information in the advertising mode. That is, the second electronic device may continuously perform steps 1500 and 1502 until the second electronic device receives the corresponding BLE advertising message.

The message transmitted by the second electronic device in the advertising mode may include mode change information (e.g., a time at which the second electronic device changes the advertising mode to the scanning mode). When all of the second electronic devices do not attend, the first electronic device may periodically enter the scanning mode. When attendee electronic devices that wish to attend enter, the first electronic device advertises connectivity information and P2P connectivity information, thereby inducing the attendee electronic devices to connect.

According to another embodiment of the present invention, the first electronic device may periodically broadcast the BLE advertising message including attendance information. In other words, the first electronic device may periodically broadcast the BLE advertising message until attendee electronic devices are all connected, thereby inducing an additional second electronic device to attend. The second electronic device may enter the scanning mode when a BLE function is operated and may receive the BLE advertising message. In this case, the first electronic device, which is a supervisor of the lesson/conference/file sharing, may broadcast the advertising message in a time sharing method while maintaining the connection.

Figure 16A:
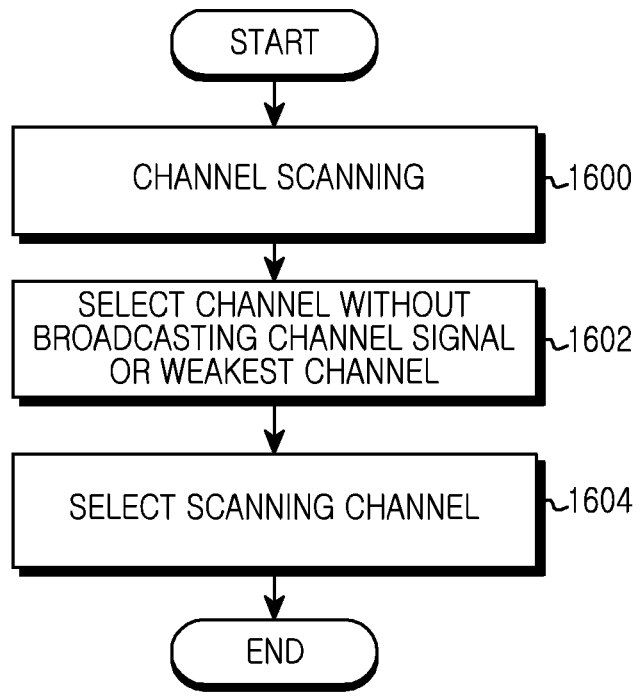
FIGS. 16A and 16B are flowcharts illustrating methods for selecting a scanning channel at a first electronic device, according to an embodiment of the present invention.
Figure 16B:
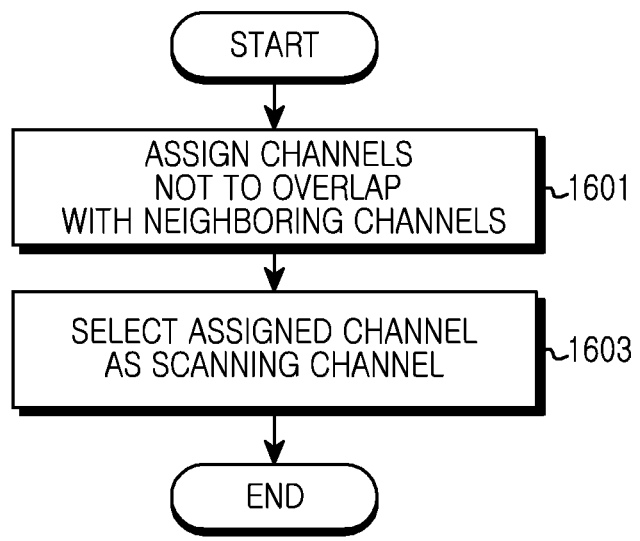

FIGS. 16A and 16B are flowcharts illustrating methods for selecting a scanning channel at a first electronic device, according to embodiments of the present invention.

Referring to FIG. 16A, the first electronic device performs channel scanning to select a channel for broadcasting a BLE advertising message, in step 1600, searches a channel having no broadcasting channel signal or a weakest channel, in step 1602, and selects the channel having no broadcasting channel signal or the weakest channel as a channel for broadcasting the BLE advertising message, in step 1604.

According to an embodiment of the present invention, referring to FIG. 16B, broadcasting channels are assigned not to overlap with neighboring channels, as shown in Table 1, in step 1601, and the first electronic device selects the broadcasting channel which is assigned not to overlap with the neighboring channels as a scanning channel, in step 1603.

When the supervisor electronic device is not able to provide the service in the middle of the lesson/conference/file sharing or should entrust a supervisor role to another agency electronic device, the supervisor role may be automatically or arbitrarily taken over by a next person.

Figure 17A:
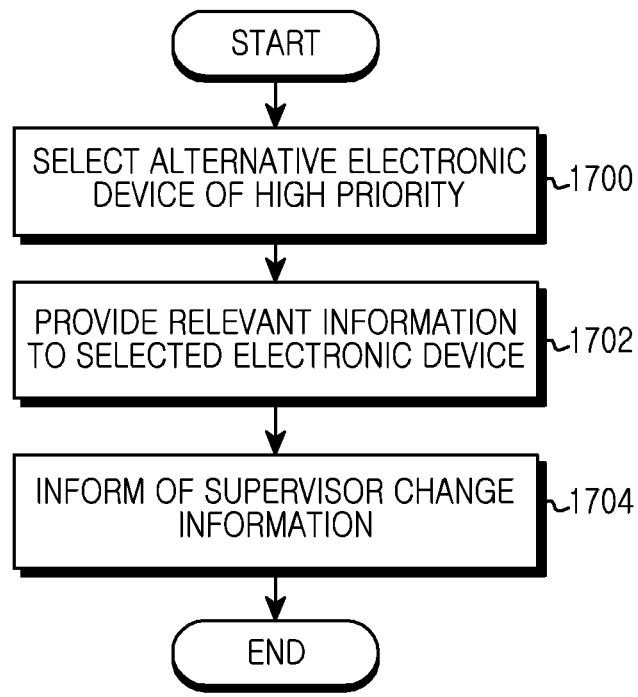
FIGS. 17A and 17B are flowcharts illustrating methods for entrusting an authority of a user who supervises a service after connecting the service, according to an embodiment of the present invention.
Figure 17B:
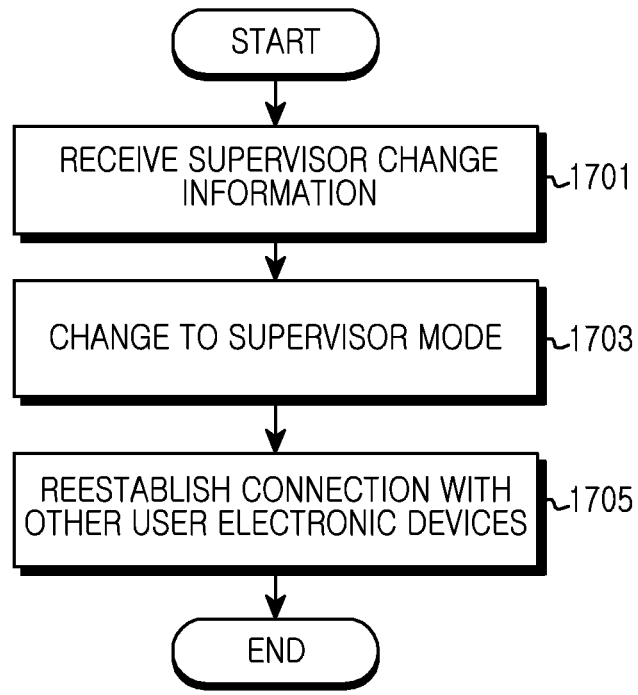

FIGS. 17A and 17B are flowcharts illustrating methods for entrusting a supervisor's authority to one of the network members or a member of another group, according to embodiments of the present invention.

Referring to FIG. 17A, a first electronic device selects an alternative electronic device of high priority, in step 1700, provides relevant information to the selected electronic device, in step 1702, and informs of supervisor change information, in step 1704.

A second electronic device (that is, an electronic device selected as an alternative electronic device) receives the supervisor change information, in step 1701, enters a supervisor mode, in step 1703, and reestablishes a connection with other user electronic devices, in step 1705. For example, the second electronic device may broadcast a BLE advertising message including connectivity information and may try to establish a TCP connection with other user electronic devices, as shown in FIGS. 3 to 5.

When an initial connection is completed, a process for delivering materials to a next supervisor candidate in advance is required. The process of delivering the materials may be performed at the same time as starting the lesson/conference/file sharing, or the lesson/conference/file sharing may be performed after the materials are delivered.

When a specific alternative member is not pre-set, a certain member may be automatically determined (e.g., according to an order of the IP address, a currently remaining battery capacity, a wireless channel state, etc.) and may be broadcasted to induce reconnection.

Methods based on the embodiments of the present invention can be implemented in hardware, software, or a combination of both.

When implemented in software, a computer readable recording medium for storing one or more programs (i.e., software modules) can be provided. The one or more programs stored in the computer readable recording medium are configured for execution performed by one or more processors in an electronic device. The one or more programs include instructions for allowing the electronic device to execute the methods based on the embodiments of the present invention.

The program (i.e., the software module or software) can be stored in a random access memory, a non-volatile memory including a flash memory, a read only memory (ROM), an electrically erasable programmable ROM (EEPROM), a magnetic disc storage device, a compact disc-ROM (CD-ROM), a digital versatile disc (DVD) or other forms of optical storage devices, and a magnetic cassette. Alternatively, the program can be stored in a memory configured as a combination of all or some of these storage media. In addition, the configured memory may be plural in number.

Further, the program can be stored in an attachable storage device capable of accessing the electronic device through a communication network, such as, for example, the Internet, an intranet, a local area network (LAN), a Wireless LAN (WLAN), or a storage area network (SAN) or a communication network configured by combining the networks. The storage device can access via an external port to the electronic device.

In addition, an additional storage device on a communication network may provide access to a portable electronic device.

As described above, since electronic devices are induced to discover one another and access the same AP by using BLE technology, a connection between electronic devices at a short distance can be effectively induced.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for connecting electronic devices in a first electronic device, the method comprising:
broadcasting, by the first electronic device, a message comprising service information for performing a service with the first electronic device and connectivity information necessary for accessing a wireless access point (AP) accessed by the first electronic device by using short-range communication;
receiving, by the first electronic device, a connection request from at least one second electronic device via the wireless AP;
connecting, by the first electronic device, the at least one second electronic device via the wireless AP; and
performing, by the first electronic device, an operation for the service based on a connection state of the at least one second electronic device,
wherein the service information comprises a unique identifier or a unique name related to the service for performing by the first electronic device.

2. The method of claim 1, further comprising transmitting at least one connection response, by the first electronic device, to the at least one second electronic device, in response to the connection request of the at least one second electronic device, via the wireless AP.

3. The method of claim 1, wherein:
the connectivity information comprises at least one of a media access control (MAC) address of the wireless AP, a service set identifier (SSID), an Internet protocol (IP) address, and a port of the first electronic device, and
the service information further comprises at least one of a time, a place, and a summary.

4. The method of claim 1, wherein the short-range communication is one of Bluetooth communication comprising a Bluetooth low energy (BLE) function, infrared ray communication, visible light communication, human body communication, Zigbee communication, near field communication (NFC), and radio frequency identification (RFID) communication.

5. The method of claim 1, further comprising:
determining, by the first electronic device, whether the short-range communication is enabled in the first electronic device; and
when the short-range communication is not enabled, enabling the short-range communication in the first electronic device.

6. A method for connecting electronic devices in a second electronic device, the method comprising:
receiving, by the second electronic device, a message from a first electronic device by using short-range communication, the message comprising service information for performing a service with the first electronic device and connectivity information necessary for accessing a wireless access point (AP) accessed by the first electronic device; and
transmitting, by the second electronic device, a connection request to the first electronic device by using the connectivity information via the wireless AP;
connecting, by the second electronic device, the first electronic device via the wireless AP; and
performing, by the second electronic device, the service with the first electronic device based on the wireless AP,
wherein the service information comprises a unique identifier or a unique name related to the service for performing by the first electronic device.

7. The method of claim 6, further comprising receiving, by the second electronic device, a connection response to the connection request from the first electronic device, via the wireless AP.

8. The method of claim 6, wherein:
the connectivity information comprises at least one of a media access control (MAC) address of the wireless AP, a service set identifier (SSID), an Internet protocol (IP) address, and a port of the first electronic device; and
the service information further comprises at least one of a time, a place, and a summary.

9. The method of claim 6, wherein the short-range communication is one of Bluetooth communication comprising a Bluetooth low energy (BLE) function, infrared ray communication, visible light communication, human body communication, Zigbee communication, near filed communication (NFC), and radio frequency identification (RFID) communication.

10. A first electronic device comprising:
at least one processor;
at least one memory; and
at least one program stored in the memory and configured for execution performed by the at least one processor,
wherein the at least one processor is configured to:
broadcast a message comprising service information for performing a service with the first electronic device and connectivity information necessary for accessing a wireless access point (AP) accessed by the first electronic device, by using short-range communication,
receive a connection request from at least one second electronic device via the wireless AP,
connect the at least one second electronic device via the wireless AP, and
perform an operation for the service based on a connection state of the at least one second electronic device,
wherein the service information comprises a unique identifier or a unique name related to the service for performing by the first electronic device.

11. The first electronic device of claim 10, wherein the processor is further configured to:
determine whether the short-range communication is in an enabled for the first electronic device; and
when the short-range communication is not enabled, enable the short-range communication in the first electronic device.

12. The first electronic device of claim 10, wherein the processor is further configured to select a broadcasting channel without a broadcasting channel signal or a lowest broadcasting channel from among scanned broadcasting channels through channel scanning.

13. The first electronic device of claim 10, wherein a channel for broadcasting the message is assigned not to overlap with neighboring channels.

14. The first electronic device of claim 10, wherein the processor is further configured to:
connect to the at least one second electronic device via the wireless AP and change a mode of the first electronic device to a scanning mode;
receive a message comprising a decision to attend the service from at least one other electronic device in the scanning mode; and
broadcast the message comprising the service information and the connectivity information necessary for accessing the wireless AP accessed by the first electronic device.

15. The first electronic device of claim 14, wherein the processor is further configured to:
determine whether all electronic devices corresponding to the service are connected; and
when all of the electronic devices corresponding to the service are connected, cease broadcast of the message.

16. The first electronic device of claim 14, wherein the processor is further configured to:
connect to the at least one second electronic device via the wireless AP;
determine whether there is a disconnection of at least one other electronic device among the at least one second electronic device;
when there is a disconnection of the at least one other electronic device, try to reconnect to the second electronic device; and
when failing to reconnect to the second electronic device, rebroadcast the message comprising the service information and the connectivity information necessary for accessing the wireless AP accessed by the first electronic device.

17. A second electronic device comprising:
at least one processor;
at least one memory; and
at least one program stored in the memory and configured for execution performed by the at least one processor,
wherein the at least one processor is configured to:
receive, from a first electronic device, a message comprising service information for performing a service with the first electronic device and connectivity information necessary for accessing a wireless AP accessed by the first electronic device by using short-range communication,
transmit a connection request to the first electronic device by using the connectivity information via the wireless AP,
connect the first electronic device via the wireless AP, and
perform the service with the first electronic device based on the wireless AP,
wherein the service information comprises a unique identifier or a unique name related to the service for performing by the first electronic device.

18. The second electronic device of claim 17, wherein the processor is further configured to:
determine whether the short-range communication is enabled in the second electronic device, and
when the short-range communication is not enabled, enable the short-range communication in the second electronic device.

19. The second electronic device of claim 17, wherein the processor is further configured to:
change a mode of the second electronic device to a transmission mode prior to connecting to the first electronic device,
transmit, to the first electronic device, a message indicating that the second electronic device will attend the service in the transmission mode, and
change from the transmission mode to a scanning mode in the second electronic device, and receive the message comprising the service information and the connectivity information necessary for accessing the wireless AP accessed by the first electronic device.

20. The second electronic device of claim 17, wherein the processor is further configured to:
connect to the first electronic device via the wireless AP,
determine whether there is a disconnection from the first electronic device,
when there is a disconnection from the first electronic device, try to reconnect to the first electronic device by using previously received connectivity information, and when failing to reconnect to the first electronic device, receive again the message comprising the service information and the connectivity information necessary for accessing the wireless AP accessed by the first electronic device.

* * * * *